US012177641B2

(12) United States Patent
Emonts

(10) Patent No.: US 12,177,641 B2
(45) Date of Patent: Dec. 24, 2024

(54) STRUCTURED DOME-SHAPED DIAPHRAGM LOUDSPEAKER

(71) Applicant: R.A.M SAS, Obernai (FR)

(72) Inventor: Daniel Emonts, Obernai (FR)

( * ) Notice: Subject to any disclaimer, the term of this patent is extended or adjusted under 35 U.S.C. 154(b) by 82 days.

(21) Appl. No.: 17/929,329

(22) Filed: Sep. 2, 2022

(65) Prior Publication Data

US 2024/0080625 A1 Mar. 7, 2024

(51) Int. Cl.

*H04R 9/06* (2006.01)
*H04R 9/02* (2006.01)
*H04R 9/04* (2006.01)

(52) U.S. Cl.

CPC ............... *H04R 9/06* (2013.01); *H04R 9/025* (2013.01); *H04R 9/046* (2013.01)

(58) Field of Classification Search

CPC ........... H04R 9/06; H04R 9/025; H04R 9/046
See application file for complete search history.

(56) References Cited

U.S. PATENT DOCUMENTS

2018/0054671 A1 * 2/2018 Voishvillo .............. H04R 9/066

FOREIGN PATENT DOCUMENTS

CN 111601221 † 8/2020
CN 202220723263.5 † 3/2022
JP 5555696 † 4/1980
JP 2010-34988 † 2/2010
JP 2010034988 A * 2/2010
JP 2010278591 † 12/2010

* cited by examiner
† cited by third party

*Primary Examiner* — Sunita Joshi
(74) *Attorney, Agent, or Firm* — Vladimir Postnikov

(57) ABSTRACT

The utility model discloses a dome-shaped diaphragm loudspeaker driver with a novel structure that comprises: a magnetic circuit assembly, a front plate mounted on one (top) side of the magnetic circuit assembly, a top dome-shaped diaphragm protruding from the middle of the top plate, which is being fixed between the front plate and the magnetic circuit assembly. A harmonic eliminator used to eliminate harmful soundwaves or resonances is being placed between the magnetic circuit assembly and the top diaphragm.

One end of the harmonic eliminator is installed in the middle of the magnetic circuit assembly; the other (top) end of the harmonic eliminator extends to the inner side of the top diaphragm. The harmonic eliminator is designed with a structured concave-convex sound-absorbing surface for the purpose of eliminating standing waves and deviating harmful sound waves, thereby acoustic distortions. When harmful sound waves are generated behind the top diaphragm, the concave and convex-shaped surfaces on the harmonic eliminator cancel out the harmful sound waves and the remaining ones are guided and then below the harmonic eliminator, so that the harmful sound waves behind the top diaphragm will not be reflected to the top diaphragm.

In this embodiment, the harmful sound waves mainly refer to standing waves.

8 Claims, 5 Drawing Sheets

STRUCTURED DOME-SHAPED DIAPHRAGM LOUDSPEAKER

TECHNICAL FIELD

The utility model relates to the technical field of loudspeaker products, in particular to a spherical-top diaphragm loudspeaker with a novel structure.

BACKGROUND TECHNIQUE

The loudspeakers currently on the market generate harmful sound waves that interfere with the sound quality when the top diaphragm emits sound, such as harmful sound waves. The traditional solution is usually to install a sound-absorbing foam in the back cavity of the top diaphragm. Although the sound-absorbing foam will absorb some harmful sound waves, the sound-absorbing foam will absorb all frequencies of sound, resulting in speaker distortion from time to time and affecting the sound quality.

In view of this, the inventors propose the following technical solutions.

UTILITY MODEL CONTENT

The purpose of the utility model is to overcome the deficiencies of the prior art and provide a spherical-top diaphragm loudspeaker with a novel structure.

In order to solve the above-mentioned technical problems, the present invention adopts the following technical scheme: the dome-shaped diaphragm speaker of the novel structure comprises:

A magnetic circuit assembly, a front plate mounted on one (top) side of the magnetic circuit assembly, a top dome-shaped diaphragm protruding from the middle of the front plate, which is being fixed between the front plate and the magnetic circuit assembly. A harmonic eliminator used to eliminate harmful soundwaves or resonances, is being placed between the magnetic circuit assembly and the top diaphragm. One end of the harmonic eliminator is installed in the middle of the magnetic circuit assembly, and the other (top) end of the harmonic eliminator extends to the inner side of the top diaphragm. The harmonic eliminator is designed with a structured concave-convex sound absorbing surface to eliminate standing waves and deviate harmful sound waves, thereby acoustic distortions. When harmful sound waves are generated behind the top diaphragm, the concave and convex-shaped surfaces on the harmonic eliminator cancel out the harmful sound waves and the remaining ones are guided and then below the harmonic eliminator, so that the harmful sound waves behind the top diaphragm will not be reflected top diaphragm. In this embodiment, the harmful sound waves mainly refer to standing waves.

Further, in the above technical solution, the concave-convex sound-absorbing surface of the harmonic eliminator includes a plurality of equal parts centred around the 1st positioning tip of some trapezoidal ribs that spreads out in a wave-like shape and a plurality of inclined surfaces that are centred around the 1st positioning tip and are equally distributed in a fan blade shape and divide the trapezoidal ribs into equal parts.

Further, in the above technical solution, the magnetic circuit assembly comprises a magnet and is matched to hold the washer by glue, and the lower yoke of the magnet by glue, the washer is fixed to the front plate with five screws. The yoke is extended in its middle with a cylindrical metal part in one piece the yoke. On top of the cylindrical part which contains a through-hole all along, and is used on its top end to install the harmonic eliminator, on its bottom end with a plurality of clips.

Further, in the above technical solution, a back chamber is installed on the bottom side of the magnetic circuit assembly; a cavity is formed between the back chamber and the yoke; a through hole connecting the cavity and the lumen formed by the top diaphragm and the cylindrical part. On top of the through-hole, the harmonic eliminator is elastically clamped and fixed into the inner wall of the through-hole with the fixing clips, and a space for airflow to pass through is formed between the harmonic eliminator and the through hole for enough clearance.

Further, in the above technical solution, the middle of the back chamber is formed with a deflector cone which extends into the through-hole and is used to guide the airflow to the back chamber sides, which contains damping material.

Further, in the above technical solution, a voice coil is glued to the top dome-shaped diaphragm, this assembly is glued to the dome mounting plate which contains also the electrical terminals wired to the voice coil. The dome mounting plate is clamped and centred with the cylindrical $2^{nd}$ positioning tip on the washer and a $1^{st}$ alignment tip on the dome mounting plate, kept in place between the washer and the front plate.

Further, in the above technical solution, the washer contains the $2^{nd}$ positioning tip for the cylindrical part to be installed through. An installation gap is formed between the cylindrical part and the washer for the purpose of installing the voice coil. The magnet is in a ring shape and sits on the cylindrical part.

Further, in the above technical solution, the washer and the front plate are connected together and fixed by a plurality of screws and positioned with a $1^{st}$ alignment tips formed within the plastic dome mounting plate.

Further, in the above technical solution, a dome mounting plate is installed between the washer and the front plate. The edge of the top dome-shaped diaphragm is installed between the dome mounting plate and the front plate; a $3^{rd}$ positioning tip for the top dome-shaped diaphragm to go through the front plate. A $4^{th}$ positioning tip on the dome mounting plate matches the $2^{nd}$ positioning tip Further, in the above technical solution, the washer and the front plate are fixed by several screws. At least 2 of $1^{st}$ alignment tips on the dome mounting plate are used to align with the $2^{nd}$ alignment tip on the washer.

Further, in the above technical solution, the harmonic eliminator is made of plastic.

After adopting the above-mentioned technical scheme, the utility model has the following beneficial effects compared with the prior art:

1, In the utility model, the harmonic eliminator is designed with a structured concave-convex sound-absorbing surface for the purpose of eliminating standing waves and deviating harmful sound waves, thereby acoustic distortions. When harmful sound waves are generated behind the top diaphragm, the concave and convex-shaped surfaces on the harmonic eliminator cancel out the harmful sound waves and the remaining ones are guided and then below the harmonic eliminator, so that the harmful sound waves behind the top diaphragm will not be reflected to the top diaphragm. In this embodiment, the harmful sound waves mainly refer to standing waves.

2, In the utility model, a back chamber is installed on the bottom side of the magnetic circuit assembly; a cavity is formed between the back chamber and the yoke; a through hole connecting the cavity and the lumen formed by the top diaphragm and the cylindrical part. On top of the through-hole, the harmonic eliminator is elastically clamped and fixed into the inner wall of the through-hole with the fixing clips, and a space for airflow to pass through is formed between the harmonic eliminator and the through hole for enough clearance. The airflow in the cavity can enter the cavity from the gap between the harmonic eliminator and the through hole, so as to improve the flowability of the airflow and make the sound more thorough.

IMPLEMENTATION

The present utility model will be further described below with reference to specific embodiments and accompanying drawings.

Figure 1:
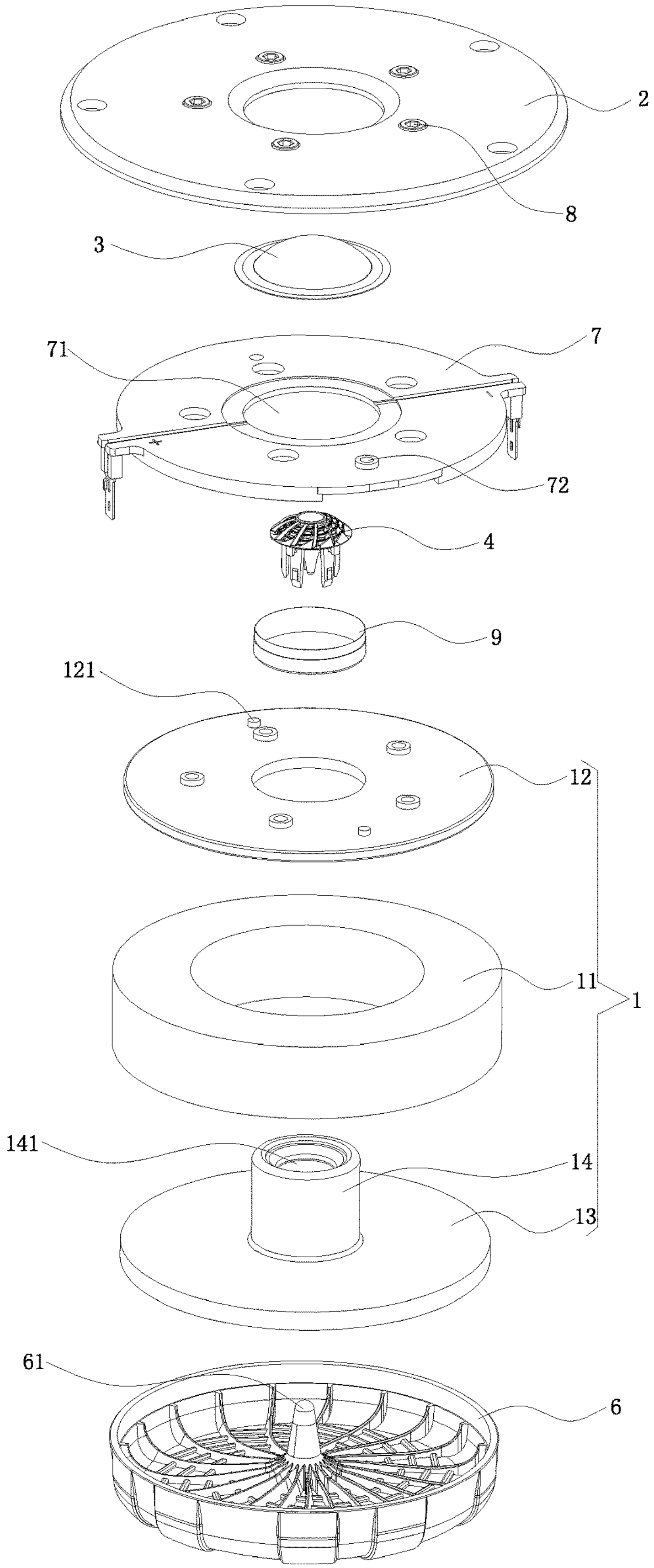
FIG. 1 is the exploded view 1 of the present utility model.
Figure 2:
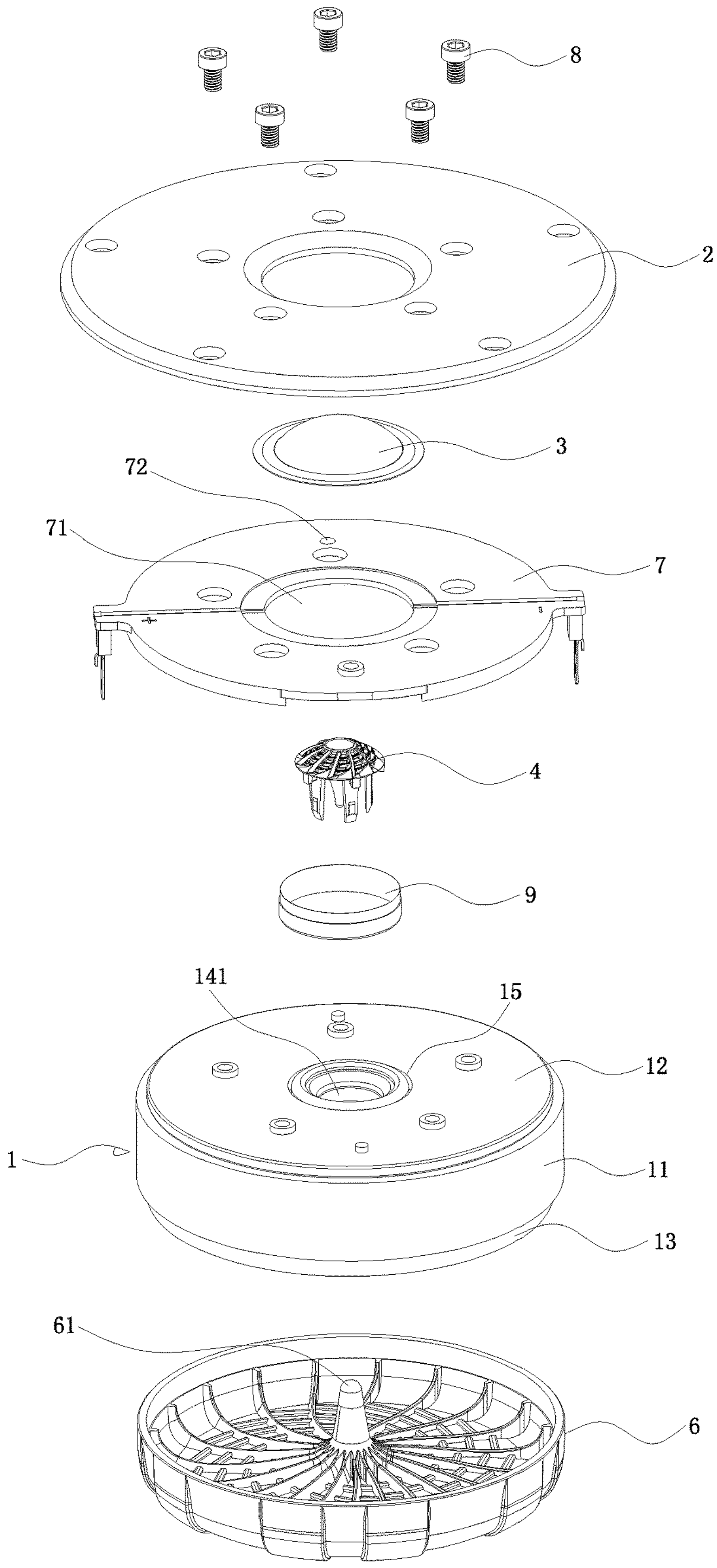
FIG. 2 is the exploded view 2 of the present utility model.
Figure 3:
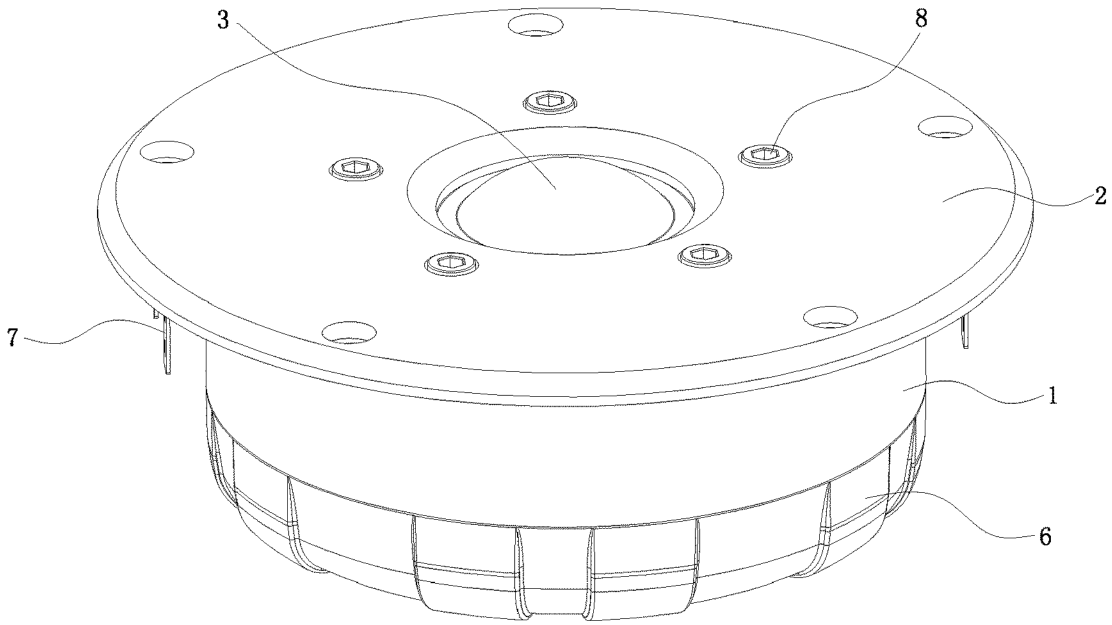
FIG. 3 is a 3D view of the present utility model.
Figure 4:
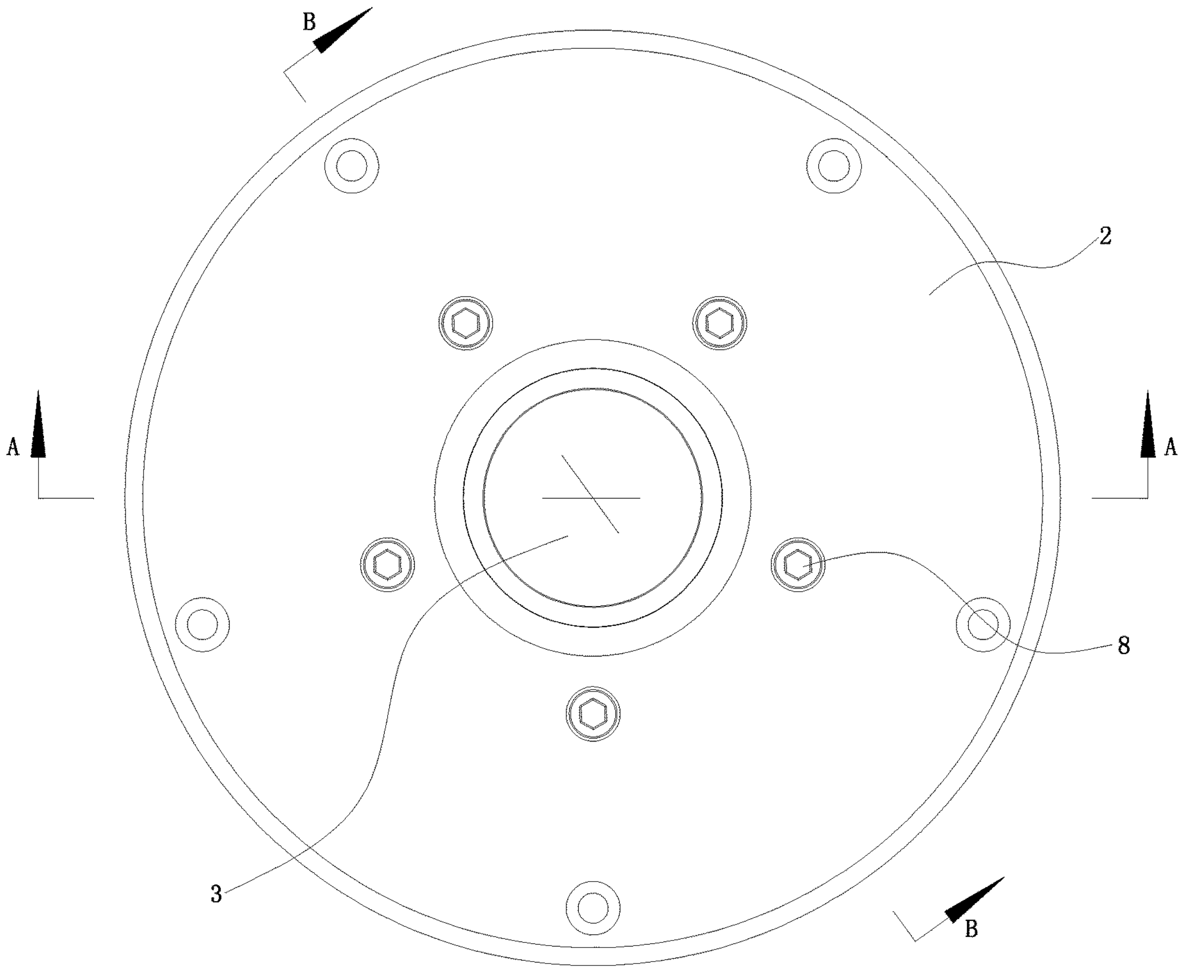
FIG. 4 is the top view of the present utility model.
Figure 5:
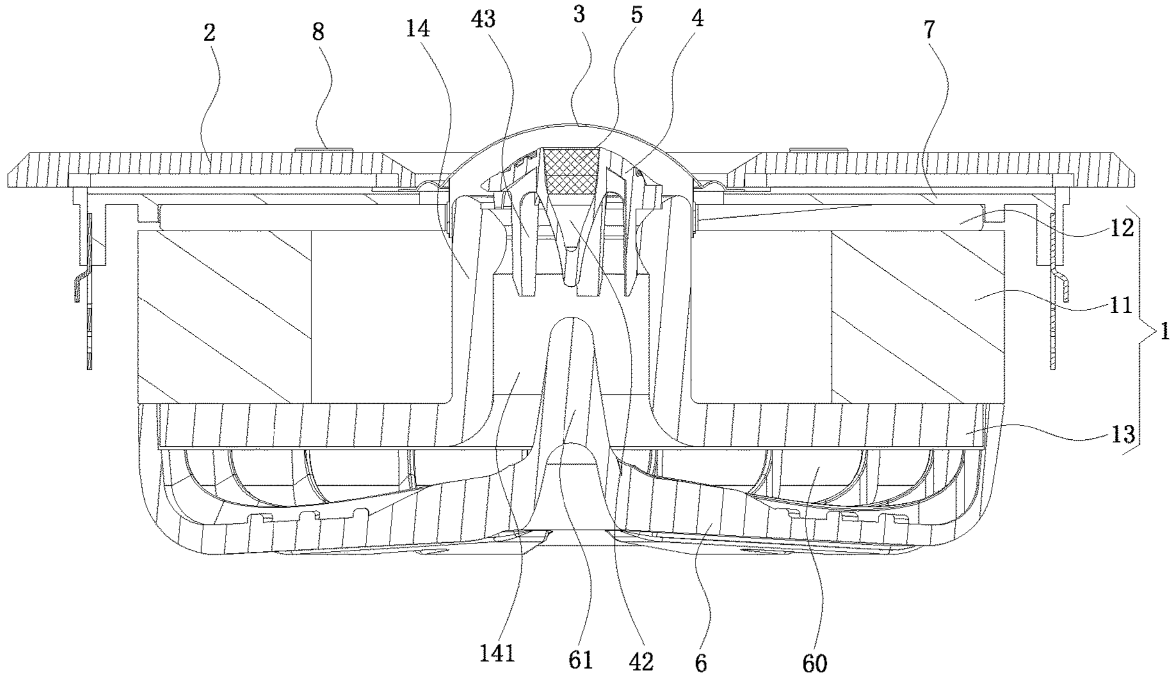
FIG. 5 is a cross-sectional view of the A-A section in FIG. 4.
Figure 6:
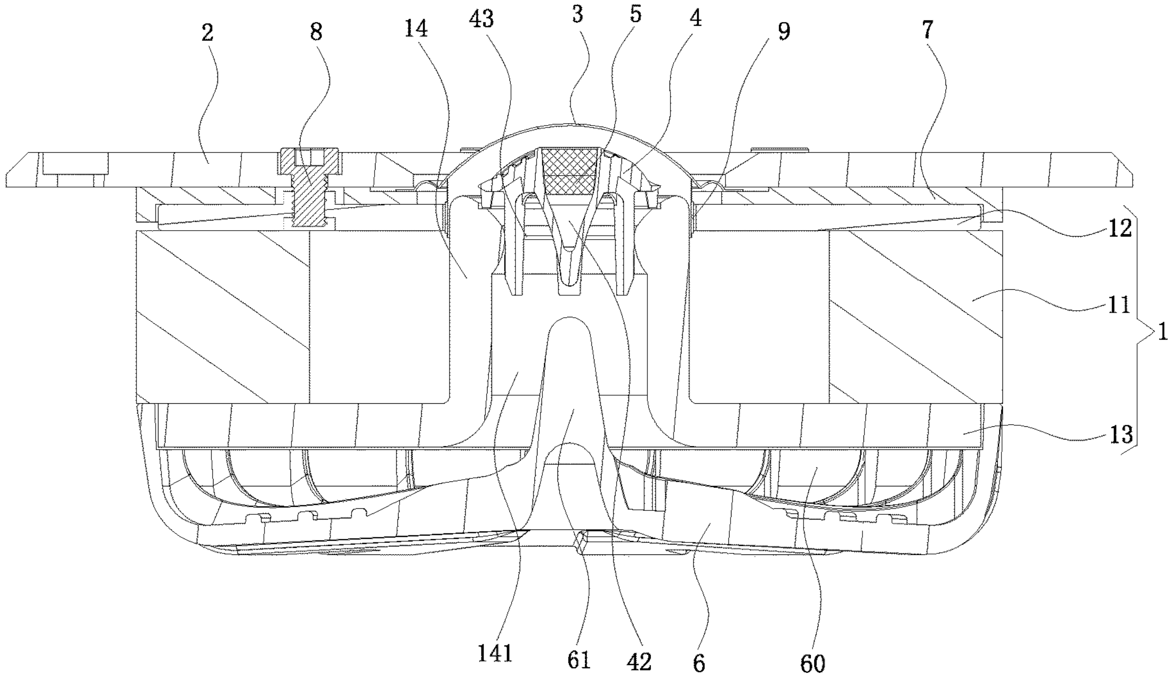
FIG. 6 is a cross-sectional view of the B-B section in FIG. 4.
Figure 7:
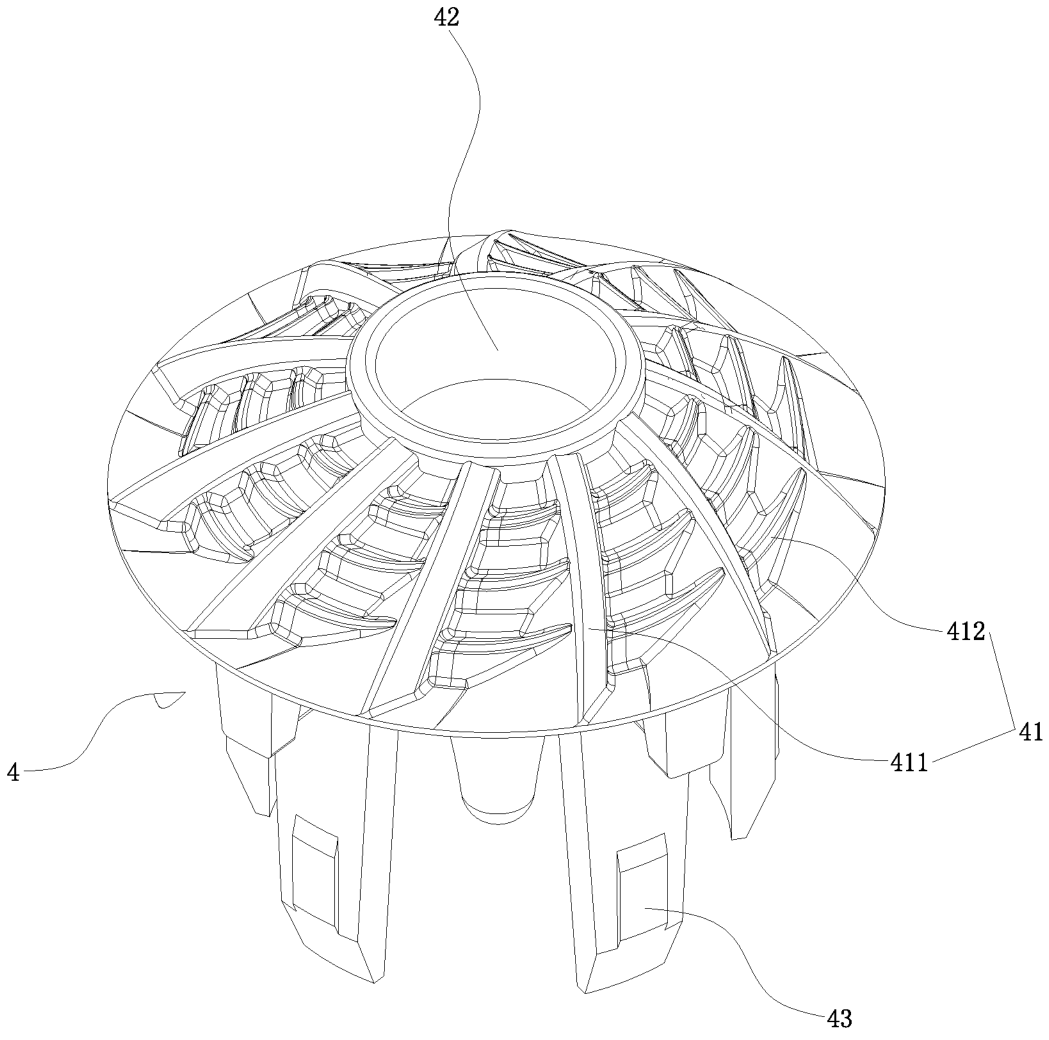
FIG. 7 is a perspective view of the harmonic suppressor of the present invention.

As shown in FIGS. 1 to 7, it is a dome-shaped diaphragm speaker with a new structure, which comprises:

a magnetic circuit assembly (1), a front plate (2) mounted on one (top) side of the magnetic circuit assembly (1), a top dome-shaped diaphragm (3) protruding from the middle of the front plate (2), which is being fixed between the front plate (2) and the magnetic circuit assembly (1). A harmonic eliminator (4) used to eliminate harmful soundwaves or resonances, is being placed between the magnetic circuit assembly (1) and the top diaphragm (3). One end of the harmonic eliminator (4) is installed in the middle of the magnetic circuit assembly (1), and the other (top) end of the harmonic eliminator (4) extends to the inner side of the tog diaphragm (3). The harmonic eliminator (4) is designed with a structured concave-convex sound absorbing surface (41) for the purpose of eliminating standing waves and deviating harmful sound waves, thereby acoustic distortions.

The harmonic eliminator (4) is installed between the magnetic circuit assembly (1) and magnetic circuit assembly (1), and a structured concave-convex sound absorbing surface (41) of the harmonic eliminator (4) which is located in the inner cavity of the top diaphragm (3) is used to cancel out harmful sound waves, thereby improving speaker distortion. When harmful sound waves are generated behind the top diaphragm (3), the concave-convex muffler surface 41 on the harmonic eliminator (4) cancels out the harmful sound waves and guides them to the side or below, so that the harmful sound waves behind the top diaphragm (3) will not be reflected to the front to deteriorate the sound quality. In this embodiment, the harmful sound waves mainly refer to standing waves.

The top end of the harmonic eliminator (4) is matched in its shape with the back of the top diaphragm (3). At the top of the dome-shaped harmonic eliminator (4) is a 1st positioning tip (42) in its centre, which is used to host a sound-absorbing foam (5).

The 1st positioning tip (42) is arranged in the middle of the harmonic eliminator (4), and the sound-absorbing foam (5) is installed in the 1st positioning tip (42), so that the harmful sound waves directly below the top diaphragm (3) are directly absorbed by the sound-absorbing foam (5), therefore further improving the sound quality. The part of the harmonic eliminator (4) which extends into the inner ring of the top diaphragm (3) is designed to a spherical shape, which not only ensures that harmonic eliminator (4) is more suitable for the top diaphragm (3) but also protects the top diaphragm (3) from being deformed by depression. Improve the durability of the product, thereby increasing the service life.

The concave-convex sound-absorbing surface (41) of the harmonic eliminator (4) includes a plurality of equal parts centred around the 1st positioning tip (42) some trapezoidal ribs (411) that spread out in a wave-like shape and a plurality of inclined surfaces (412) that are centred around the 1st positioning tip (42) and are equally distributed in a fan blade shape and divide the trapezoidal ribs (411) into equal parts.

The trapezoidal ribs (411) and the inclined surfaces (412) are used to form uneven shapes similar to the karst landforms so that most of the harmful sound waves will be directly absorbed and offset the energy after entering, and a small part of the sound wave will be reflected and guided to the side or below, thereby cancelling out the harmful sound waves.

The magnetic circuit assembly (1) comprises a magnet (11) and is matched to hold the washer (12) by glue, and the lower yoke (13) of the magnet (11) by glue, the washer (12) is fixed to the front plate (2) with five screws (8). The yoke (13) is extended in its middle with a cylindrical metal part (14) in one piece the yoke (13). On top of the cylindrical part (14) which contains a through hole (141) all along, and is used on its top end to install the harmonic eliminator (4), on its bottom end with a plurality of clips (43).

the middle of the back chamber (6) is formed with a deflector cone (61) which extends into the through hole (141) and is used to guide the airflow to the back chamber (6) sides, which contains damping material.

The back chamber (6) is installed on the bottom side of the magnetic circuit assembly (1); a cavity (60) is formed between the back chamber (6) and the yoke (13); a through hole (141) connecting the cavity (60) and the lumen formed by the top diaphragm (3) and the cylindrical part (14). On top of the through hole (141), the harmonic eliminator (4) is elastically clamped and fixed into the inner wall of the through hole (141) with the fixing clips (43), and space for airflow to pass through is formed between the harmonic eliminator (4) and the through hole (141) for enough clearance and improve the airflow. Furthermore, installing a harmonic eliminator (4) on top of the through hole (141) will prevent the high-frequency sound waves enter the cavity (60), and cause absorption of the high-frequency sound waves, which impacts the sound quality.

The washer (12) contains the $2^{nd}$ positioning tip (121) for the cylindrical part (14) to be installed through. An installation gap (15) is formed between the cylindrical part (14) and the washer (12) for the purpose of installing the voice coil (9). The magnet (11) is in a ring shape and sits on the cylindrical part (14).

The washer (12) and the front plate (2) are connected together and fixed by a plurality of screws (8), and positioned with a 1$^{st}$ alignment tips (72) formed within the plastic dome mounting plate (7).

The dome mounting plate (7) is installed between the washer (12) and the front plate (2). The edge of the top dome-shaped diaphragm (3) is installed between the dome mounting plate (7) and the front plate (2); a 3$^{rd}$ positioning tip (21) for the top dome-shaped diaphragm (3) to go through the front plate (2). A 4$^{th}$ positioning tip (71) on the dome mounting plate (7) matches the 2$^{nd}$ positioning tip (121)

The washer (12) and the front plate (2) are fixed by several screws (8). At least 2 of 1$^{st}$ alignment tips (72) on the dome mounting plate (7) are used to align with the 2$^{nd}$ alignment tips (122) on the washer (12).

By inserting two or more 2$^{nd}$ positioning tips (121) into the 1$^{st}$ alignment tips (72), the position limit of dome mounting plate (7) relative to the washer (12) is realized, and the relative movement of the dome mounting plate (7) is limited, and the screws (8) also penetrate the dome mounting plate (7) to further fix the positioning of the dome mounting plate (7).

The harmonic eliminator (4) is made of plastic material. Since the harmonic eliminator (4) is a plastic part, it has no direct absorption effect on the sound, so it will not absorb the energy of the high-frequency part and the sound of the high-frequency part will not be greatly attenuated. The sound-absorbing foam (5) which is installed in the middle of the harmonic eliminator (4), compared with the traditional sound-absorbing foam, is much smaller and is located in the inner cavity of the harmonic eliminator (4). Therefore, it will not have a great impact on the energy of high-frequency sound, so it can absorb harmful sound waves while absorbing harmful sound waves. It can reduce the impact on the high-frequency sound, achieve the effect of reducing distortion and improve sound quality.

To sum up, in the present invention, the harmonic eliminator (4) which is added to the inner cavity of the top dome-shaped diaphragm (3) utilizes its structured concave-convex sound absorbing surface (41) at the top of the harmonic eliminator (4) to approach the top dome-shaped diaphragm (3). So that the sound waves generated by the top dome-shaped diaphragm (3), are spread around by the concave-convex shape on the surface of the harmonic eliminator (4) and are guided to the side or to the below, and the below part is absorbed by the sound-absorbing foam (5) in the middle of the harmonic eliminator (4); Since the harmonic eliminator (4) itself is made of plastic material, it causes no impact on sound absorption, it will not absorb the energy of the high-pitched sound, and will not have a great attenuation on the high-frequency part.

Of course, the above descriptions are only specific examples of the present invention and are not intended to limit the scope of implementation of the present invention. Any equivalent changes or modifications made according to the structures, features and principles described in the scope of the patent application of the present invention are not intended to limit the scope of the present invention. It should be included in the scope of the patent application of this utility model.

The invention claimed is:

1. A dome-shaped diaphragm loudspeaker driver comprising:

- a magnetic circuit assembly (1);
- a front plate (2) mounted on the top side of the magnetic circuit assembly (1);

- a top dome-shaped diaphragm (3) protruding from the center of the front plate (2) and secured between the front plate (2) and the magnetic circuit assembly (1);
- a harmonic eliminator (4) positioned between the magnetic circuit assembly (1) and the top diaphragm (3) to eliminate harmful sound waves or resonances;
- wherein one end of the harmonic eliminator (4) is installed at the center of the magnetic circuit assembly (1), and the opposite end extends to the inner side of the top diaphragm (3);
- wherein the harmonic eliminator (4) features a structured concave-convex sound-absorbing surface (41) designed to eliminate standing waves and divert harmful soundwaves, thereby reducing acoustic distortions;
- wherein the concave and convex surfaces of the harmonic eliminator (4) cancel harmful sound waves generated behind the top diaphragm (3), guiding any remaining waves below the harmonic eliminator (4) to prevent reflection back to the top diaphragm (3);
- wherein the top end of the harmonic eliminator (4) is shaped to match the back of the top diaphragm (3);
- wherein the top of the dome-shaped harmonic eliminator (4) includes a first positioning tip (42) at its center, configured to hold a sound-absorbing foam (5);
- wherein the concave-convex sound-absorbing surface (41) of the harmonic eliminator (4) includes:
  - a plurality of equal sections centered around the first positioning tip (42); and
  - trapezoidal ribs (411) that extend outward in a wave-like pattern from the first positioning tip (42);
- wherein a plurality of inclined surfaces (412) are centered around the first positioning tip (42), arranged in a fan blade shape, and equally divide the trapezoidal ribs (411) into equal parts.

2. A dome-shaped diaphragm loudspeaker driver comprising:

- a magnetic circuit assembly (1);
- a front plate (2) mounted on the top side of the magnetic circuit assembly (1);
- a top dome-shaped diaphragm (3) protruding from the center of the front plate (2) and secured between the front plate (2) and the magnetic circuit assembly (1);
- a harmonic eliminator (4) positioned between the magnetic circuit assembly (1) and the top diaphragm (3) to eliminate harmful sound waves or resonances;
- wherein one end of the harmonic eliminator (4) is installed at the center of the magnetic circuit assembly (1), and the opposite end extends to the inner side of the top diaphragm (3);
- wherein the harmonic eliminator (4) features a structured concave-convex sound-absorbing surface (41) designed to eliminate standing waves and divert harmful soundwaves, thereby reducing acoustic distortions;
- wherein the concave and convex surfaces of the harmonic eliminator (4) cancel harmful sound waves generated behind the top diaphragm (3), guiding any remaining waves below the harmonic eliminator (4) to prevent reflection back to the top diaphragm (3);
- wherein the top end of the harmonic eliminator (4) is shaped to match the back of the top diaphragm (3);
- wherein the top of the dome-shaped harmonic eliminator (4) includes a first positioning tip (42) at its center, configured to hold a sound-absorbing foam (5);
- wherein the magnetic circuit assembly (1) comprises a magnet (11) and is matched to hold the washer (12) by glue, and the lower yoke (13) of the magnet (11) by glue, the washer (12) is fixed to the front plate (2) with five screws (8);

wherein the yoke (13) is extended in its middle with a cylindrical metal part (14) in one piece the yoke (13); and wherein on top of the cylindrical part (14) which contains a through hole (141) all along, and is used on its top end to install the harmonic eliminator (4), on its bottom end with a plurality of clips (43).

3. The dome-shaped diaphragm loudspeaker driver of claim 2, wherein:

a back chamber (6) is installed on the bottom side of the magnetic circuit assembly (1);

a cavity (60) is formed between the back chamber (6) and the yoke (13);

a through hole (141) connecting the cavity (60) and the lumen formed by the top diaphragm (3) and the cylindrical part (14); and on top of the through hole (141), the harmonic eliminator (4) is elastically clamped and fixed into the inner wall of the through hole (141) with the fixing clips (43), and space for airflow to pass through is formed between the harmonic eliminator (4) and the through hole (141) for enough clearance.

4. The dome-shaped diaphragm loudspeaker driver of claim 3, wherein:

the middle of the back chamber (6) is formed with a deflector cone (61) which extends into the through hole (141) and is used to guide the airflow to the back chamber (6) sides, which contains damping material.

5. The dome-shaped diaphragm loudspeaker driver of claim 3, wherein:

a voice-coil (9) is glued to the top dome-shaped diaphragm (3), and this assembly is glued to dome mounting plate (7) which contains also the electrical terminals wired to the voice-coil (9);

the dome mounting plate (7) is clamped and centered with the cylindrical 2nd positioning tip (121) on the washer (12) and a first alignment tip (72) on the dome mounting plate (7), kept in place between the washer (12) and the front plate (2);

the washer (12) contains the second positioning tip (121) for the cylindrical part (14) to be installed through;

an installation gap (15) is formed between the cylindrical part (14) and the washer (12) for the purpose of installing the voice coil (9); and the magnet (11) is in a ring shape and sits on the cylindrical part (14).

6. The dome-shaped diaphragm loudspeaker driver of claim 5, wherein:

the washer (12) and the front plate (2) are connected together and fixed by a plurality of screws (8), and positioned with a first alignment tips (72) formed within the plastic dome mounting plate (7);

a dome mounting plate (7) is installed between the washer (12) and the front plate (2);

the edge of the top dome-shaped diaphragm (3) is installed between the dome mounting plate (7) and the front plate (2);

a third positioning tip (21) for the top dome-shaped diaphragm (3) to go through the front plate (2); and a fourth positioning tip (71) on the dome mounting plate (7) matches the second positioning tip (121).

7. The dome-shaped diaphragm loudspeaker driver of claim 6, wherein:

the washer (12) and the front plate (2) are fixed by several screws (8); and at least 2 of first alignment tips (72) on the dome mounting plate (7) are used to align with the second alignment tips (122) on the washer (12).

8. The dome-shaped diaphragm loudspeaker driver of claim 6, wherein the harmonic eliminator (4) is made of plastic.

* * * * *